3,228,796
METHOD OF AND MEANS FOR APPLYING ACTIVE MATERIAL TO THE PLATES OF ELECTRIC ACCUMULATORS

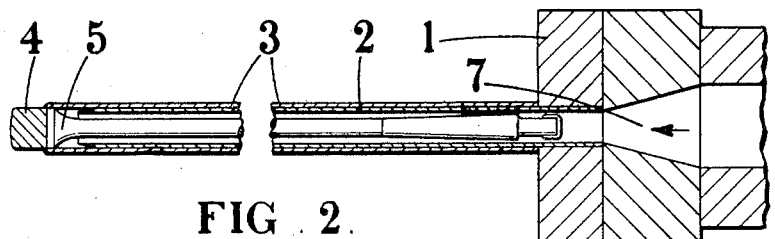
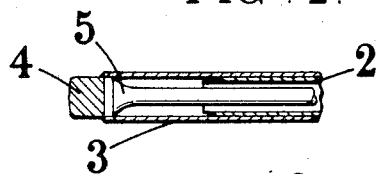
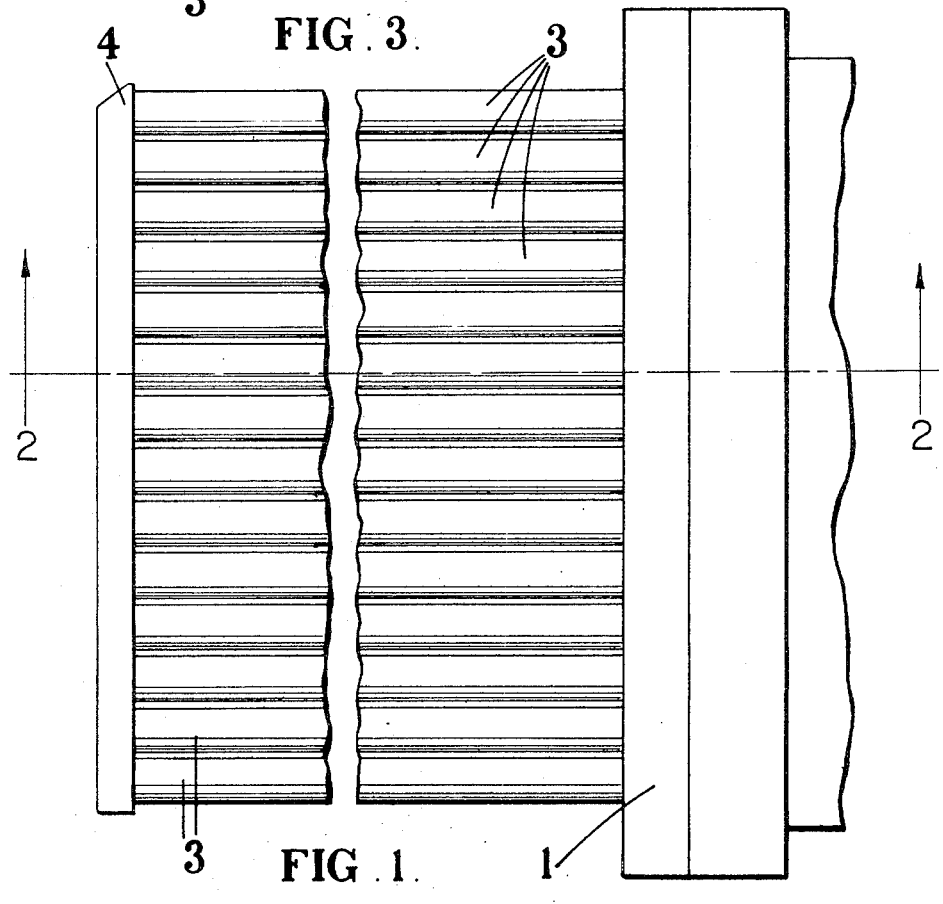

Montefiore Barak, Manchester, Kenneth Peters, Salford, and Frank Jackson, Swinton, England, assignors to The Chloride Electrical Storage Company Limited, London, England, a company of Great Britain
Filed Apr. 23, 1962, Ser. No. 189,464
Claims priority, application Great Britain, May 5, 1961, 16,435/61
1 Claim. (Cl. 136—67)

This invention relates to electric accumulators and is more specifically concerned with the application of the active material to the plates of such accumulators. While the invention is applicable to, and provides a number of advantages in, the manufacture of pasted or Faure type flat plates for lead-acid accumulators, it provides particular advantages and improvements in the manufacture of tubular type plates therefor.

The flat type of plate is generally prepared by mixing lead oxides with sulphuric acid and water to form an active material paste of desired consistency which is then applied to an open supporting grid. The use of excessive pressure when applying the paste must be avoided if water is not to be lost from the paste, as this may result in the density of the active material increasing, thereby lowering the electrical capacity of the formed plate and causing an unnecessarily excessive and wasteful amount of lead to be applied to the grid. This necessitates care when employing hand-pasting methods and may present a particular problem when pasting machines are used.

Tubular type plates for lead-acid accumulators include spaced pencils of active material surrounding conducting spines, with the active material retained with porous insulating sheaths or tubes of ebonite or acid-resisting plastic material. The usual method of manufacturing such plates is to utilize lead oxides in powdered form, which powder is introduced from a supply hopper into the annular space between the tubes and spines and compacted by vigorous shaking. Such a method is wasteful in that much powder dust is created and liberated, while it is also difficult to control with regard to ensuring a consistent filling weight and evenness of filling. Furthermore, when using woven fabric tubes which are desirably thin and may tend to be flabby in their normal state, such tubes may require to be impregnated with a suitable stiffening agent simply to facilitate their filling by such conventional methods involving vigorous shaking.

One object of the present invention is to provide active materials in a form suitable for use in either pasted or tubular type plates. Further objects are to provide active materials for tubular type plates and a method of filling such tubes with the said materials which avoid the disadvantage and overcome the difficulties described above. A still further object is to simplify and reduce the cost of manufacture of both pasted and tubular type plates.

In accordance with the invention, we provide an active material paste for the plates of lead-acid accumulators which comprises a mixture of lead oxide in powder form with water and a water soluble thickening agent, the said thickening agent being included in an amount sufficient to absorb the water and impart a stable plastic consistency to the paste.

The lead oxide may comprise "grey oxide," that is the type generally used in the lead-acid accumulator industry for the preparation of active materials consisting of a mixture of finely comminuted lead powder and litharge, or it may comprise mixtures of grey oxide or ground grey oxide with red lead. The said lead oxide may alternatively comprise grey oxide which has been pre-sulphated by mixing with sulphuric acid, the resulting sulphated oxide still retaining a dry, powdery quality.

The water soluble thickening agent is present in an amount of from 0.05% to 1.0% of the weight of the dry powdered lead oxide and consists in a material which has a high thickening efficiency in dilute solutions. Examples of such materials which we have found to be particularly suitable for use in the present invention are methyl cellulose, ethyl hydroxy cellulose and the high molecular weight polymers of ethylene oxide. Cellulose ether polyethylene glycol and polyvinyl pyrrolidone also exhibit the required property but to a lesser degree.

According to a particular feature of the invention, there is provided a method of manufacturing a tubular type plate for lead acid accumulators which includes the steps of mixing lead oxide in powder form with water and a water soluble thickening agent to form a stable paste of plastic consistency, and extruding the said paste under pressure into the tubes of the plate.

We have found that active material pastes containing thickening agents as aforesaid can be subjected to considerable compressive and shear forces without any loss of water. This is due to the very high water absorptive properties they possess which ensure that the water is retained in the paste mixture even though subjected to considerable pressure.

Our improved active material pastes are very suitable for use with open mesh grids for Faure type pasted plates of lead-acid accumulator whether the paste being applied manually or by a pasting machine, since the pasting techniques employed with such grids need no longer be so carefully controlled as has been necessary hitherto. A further advantage is that after the pasting operation, such plates need undergo much simpler setting and ageing processes than have been necessary heretofore, that is when using pastes made with dilute sulphuric acid, prior to being dried and subjected to the usual process of electrochemical formation.

A paste mixture which is suitable for use in the manufacture of pasted Faure type plates is set forth in the following example:

Example 1

Ground grey oxide _____ 80%.
Red lead _____ 20%.
Polyethylene oxide _____ 0.5% of weight of total dry oxide.
Water _____ 72 cc./lb. of total dry oxide.

The mixing of the paste constituents is carried out in a standard type of dough mixer or edge runner mixer as commonly used in the accumulator industry for mixing active material pastes.

Active material pastes in accordance with the invention are also particularly suitable and advantageous in the manufacture of tubular type plates for lead-acid batteries, replacing the dry powdered lead oxides used hitherto. Thus they make possible the filling of the tubes of such plates by methods involving extrusion under pressure, thereby avoiding the problems and disadvantages attendant with the filling methods conventionally employed for dry powdered oxides.

Two methods of filling such plates with our active material pastes by extrusion will now be described by way of example with reference to the accompanying drawings in which:

FIGURE 1 is an elevational view and FIGURE 2 a sectional view on the line 2—2 of FIGURE 1 showing means for supplying active material paste to tubular type plates.

FIGURE 3 shows a tubular plate in process of being forced off the tubes through which the active paste is delivered into the tubes of the tubular plate.

Figure 5:
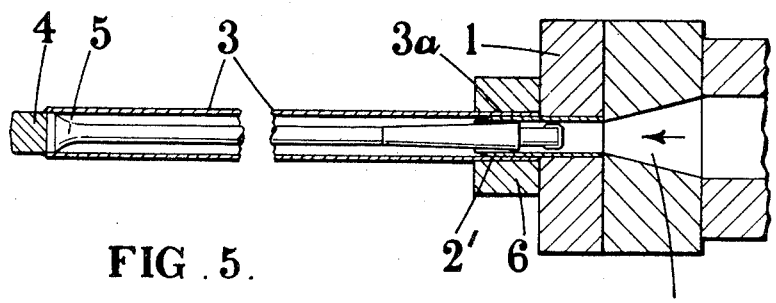

The extruder head 1 of a screw or ram type extrusion machine consists of a number of metallic tubes 2 over which the full lengths of the tubes 3 of the battery plate are fitted. The said plate tubes may already be assembled on to the top bar 4 and conducting spines 5 of the plate such that the spines pass inside of the extruder tubes 2 and the paste is introduced at 7 through the open ends of the extruder tubes 2 towards the top ends of the plate 3. As the paste is forced into the plate from the extruder, the plate tubes 3 and spines 5 are gradually withdrawn from the extruder tubes 2 so that the plate tubes 3 are progressively and evenly filled from top to bottom. Alternatively, the pressure of the paste as it is being extruded may be relied on to force the plate tubes and spines off the extruder tubes. The plate assembly may be completed by fitting a suitable bottom bar into which the open ends of the tubes 3 fit.

Figure 4:
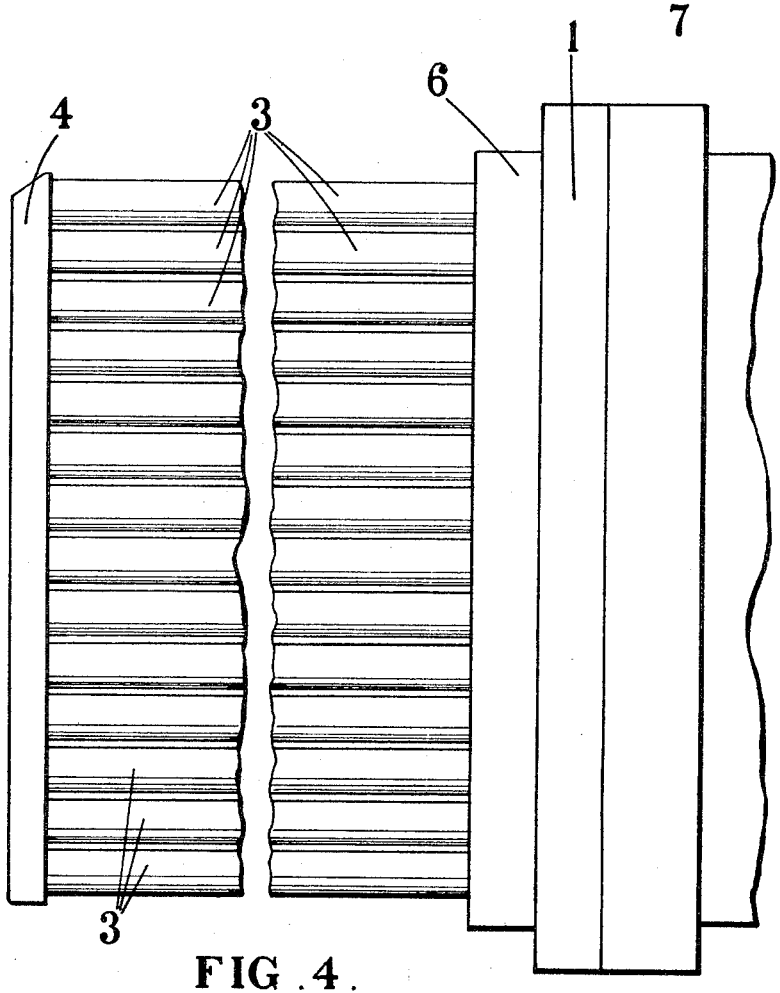
FIGURE 4 is a view similar to FIGURE 1 and FIGURE 5 a view similar to FIGURE 2 but showing a modified arrangement.

In the method, as illustrated in FIGURES 4 and 5, the ends 3a only of the battery plate tubes 3 are fitted each to a short metallic tube $2^1$ attached to the extruder head 1, and the paste is forced along the full length of the plate tubes which remain stationary. The ends 3a of the plate tubes 3 are gripped firmly on to the short extruder tubes $2^1$ by a grooved clamp 6. In this arrangement it will be understood that a greater extrusion pressure is necessary, and it becomes desirable to prevent the possibility of paste being forced through the permeable or porous plate tubes. This may be achieved by sealing the said tubes with a water-soluble filler such as sodium silicate, by including a thin temporary liner on the inner surface of each tube, or by enclosing the tubes in a tightly fitting jig.

Typical paste mixtures which have been found suitable for filling tubular type plates by the above described methods are set out in the following examples.

*Example 2*

| | |
|---|---|
| Ground grey oxide | 80%. |
| Red lead | 20%. |
| Polyethylene oxide | 0.5% of weight of total dry oxide. |
| Water | 85 cc./lb. of total dry oxide. |

The mixing of the paste constituents is carried out as in Example 1 above.

*Example 3*

| | |
|---|---|
| Ground grey oxide | 50%. |
| Red lead | 50%. |
| Polyethylene oxide | 0.5% of weight of total dry oxide. |
| Water | 80 cc./lb. of total dry oxdie. |

The method of mixing is as in Example 1 above.

*Example 4*

| | |
|---|---|
| Water | 80 cc./lb. of total dry oxide. |
| Pre-sulphated grey oxide | 100%. |
| Polyethylene oxide | 0.5% of weight of total dry oxide. |

In this case the grey oxide powder is first mixed with sulphuric acid of 1.4 specific gravity, the amount of acid being in the range of 20 cc./lb. to 50 cc./lb. of the dry oxide. The acid is added to the oxide slowly during a mixing period of several minutes. At the end of this operation the sulphated oxide retains a dry powdery quality, and the polyethylene oxide and water are then added for further mixing.

Tubular plates which have been filled with our active material pastes by methods of extrusion as described above can, if desired, be sulphated by immersion in strong sulphuric acid and oven-dried in the usual way, prior to being subjected to electrochemical formation.

Such plates may alternatively be submitted to electrochemical formation immediately after being filled, that is without any sulphation and drying stages, the said formation being carried out in sulphuric acid of 1.060 specific gravity.

In either case, the immersion of the plates in sulphuric acid, whether for the purposes of sulphation or formation, causes the polyethylene oxide still present in the active material to be leached out therefrom.

Alternatively, the polyethylene oxide may be leached out by soaking the filled plates in water immediately after filling and before being electrochemically formed.

It will be appreciated from the foregoing description that the filling of tubular plates by the method of extrusion, as made possible by the use of the active material pastes of the present invention, represents a marked improvement over the methods used hitherto with dry oxide powders. Furthermore, plates incorporating tubes made from woven fabrics can be filled by the above described methods without the fabric having to be subjected to any previous stiffening treatment.

What is claimed is:

A method of manufacture of tubular type plates for lead acid accumulators, in which the tubes of the plates are of a material providing access therethrough for acid electrolyte, including the steps of first assembling the conducting spines in each of said tubes; fitting each of the tubes of said plate tubes containing said conducting spines over an extruder tube, the extruder tube passing initially along substantially the full length of each plate tube with said conducting spines of the plate passing inside the extruder tubes and wherein the said plate tube and spines are retracted progressively from its extruder tube as the filling proceeds; filling the tubes of the said plates by extruding an active material paste comprising a mixture of lead oxide in powder form, water and a water-soluble thickening agent, the said thickening agent being included in an amount sufficient to absorb the water and impart a stable plastic consistency to the paste, said extrusion being under pressure into the said tubes containing said spines.

References Cited by the Examiner

UNITED STATES PATENTS

| 2,674,642 | 4/1954 | Agruss et al. | 136—26 |
| 2,981,776 | 4/1961 | Dunn et al. | 136—27 |
| 3,011,007 | 11/1961 | Evers et al. | 136—26 |
| 3,062,908 | 11/1962 | Salkind | 126—24 |

WINSTON A. DOUGLAS, *Primary Examiner.*

MURRAY TILLMAN, JOHN H. MACK, *Examiners.*